United States Patent [19]
Shimizu et al.

[11] Patent Number: 5,228,136
[45] Date of Patent: Jul. 13, 1993

[54] METHOD AND APPARATUS TO MAINTAIN CACHE COHERENCY IN A MULTIPROCESSOR SYSTEM WITH EACH PROCESSOR'S PRIVATE CACHE UPDATING OR INVALIDATING ITS CONTENTS BASED UPON SET ACTIVITY

[75] Inventors: Shigenori Shimizu, Kawasaki; Moriyoshi Ohara, Tokyo, both of Japan

[73] Assignee: International Business Machines Corporation, Armonk, N.Y.

[21] Appl. No.: 639,440

[22] Filed: Jan. 10, 1991

[30] Foreign Application Priority Data

Jan. 16, 1990 [JP] Japan ................................ 2-4668

[51] Int. Cl.⁵ ............................................ G06F 13/00
[52] U.S. Cl. ................................. 395/425; 364/240.1; 364/243.41; 364/243.44; 364/964.32; 364/964.34; 364/DIG. 1
[58] Field of Search ....................... 395/400, 425; 364/200 MS File, 900 MS File

[56] References Cited

U.S. PATENT DOCUMENTS

| | | | |
|---|---|---|---|
| 3,840,862 | 10/1974 | Ready | 395/400 |
| 3,848,234 | 11/1974 | MacDonald | 395/425 |
| 3,938,097 | 2/1976 | Niguette, III | 395/425 |
| 4,392,200 | 7/1983 | Arulpragasam et al. | 395/425 |
| 4,843,542 | 6/1989 | Dashiell et al. | 395/425 |
| 4,959,777 | 9/1990 | Holman, Jr. | 364/200 |
| 5,008,813 | 4/1991 | Crane et al. | 395/425 |
| 5,025,365 | 6/1991 | Mathur et al. | 395/600 |
| 5,056,002 | 10/1991 | Watanabe | 395/425 |

Primary Examiner—Joseph L. Dixon
Assistant Examiner—Frank J. Asta
Attorney, Agent, or Firm—Lynn L. Augspurger

[57] ABSTRACT

A cache coherency mechanism enabling efficient and dynamic switching between the maintenance protocols of the invalidate and update types. The mechanism can reduce traffic on the shared bus and improve the system performance. Usually each processor repeatedly accesses a limited area of the memory within a short span of time. That area is referred to as a "working set" with respect to the processor. Each time a write operation occurs to shared data, each of the sharing processors determines whether or not the data belongs to its working set. If a sharing processor determines that the data belongs to its working set, then the cache consistency is maintained by the update type of procedure. Otherwise cache consistency is maintained via the invalidate type of procedure. In one embodiment the invention improves the system performance by utilizing the above mechanism for determining the working set in conjunction with a new cache protocol, ALL_READ. A plurality of processors in a multiprocessor system using snoopy caches frequently share data or instruction code at one address. According to the ALL_READ protocol when a processor causes a read miss for data or code at an address, other processors likely to use the data or code automatically read it into their caches. By using the working set determination mechanism, only data in the working set is applied with ALL_READ. This invention thereby provides ALL_READ efficiently, reduces bus traffic and improves the system performance.

10 Claims, 5 Drawing Sheets

OVERALL CONFIGURATION

CACHE CONFIGURATION

```
LOOP:   LOAD   R0,X         (1)
        CMP    R0,1         (2)
        JE     LOOP         (3)
        TS     X            (4)
        JNZ    LOOP         (5)

┌─────────────┐
        │  CRITICAL   │
        │             │     (6)
        │  SECTION    │
        └─────────────┘

STORE  X,0          (7)
```

SPIN LOCK

FIG. 5

$$C = A \times B$$

|  | 120 |  |  |  | 120 |  |  |  | 120 |  |  |
|---|---|---|---|---|---|---|---|---|---|---|---|
| 120 | C11 | C12 | C13 | = 120 | A11 | A12 | A13 | × 120 | B11 | B12 | B13 |
|  | C21 | C22 | C23 |  | A21 | A22 | A23 |  | B21 | B22 | B23 |
|  | C31 | C32 | C33 |  | A31 | A32 | A33 |  | B31 | B32 | B33 |

MULTIPLICATION OF MATRICES

ALLOCATION OF PARTIAL MATRIX CALCULATION TO PROCESSOR

FIG. 7

METHOD AND APPARATUS TO MAINTAIN CACHE COHERENCY IN A MULTIPROCESSOR SYSTEM WITH EACH PROCESSOR'S PRIVATE CACHE UPDATING OR INVALIDATING ITS CONTENTS BASED UPON SET ACTIVITY

BACKGROUND OF THE INVENTION

A. Field of the Invention

This invention relates to a multiprocessor system having a plurality of processors connected to a shared bus and a shared memory through respective private caches. More particularly, this invention relates to such a multiprocessor system adopting a so-called snoopy cache architecture wherein each private cache is provided with a controller which monitors signals on the shared bus and manipulates data in the private cache, for example, for maintaining data consistency among the private caches.

B. Related Art

While there are a number of types of conventional multiprocessor systems, tightly coupled multiprocessor systems are increasingly coming into practical use.

In one such type of tightly coupled multiprocessor system, a plurality of processors read from or write to a shared memory connected to a shared bus. Without private caches, each processor has to accomplish read/write access to the shared memory through the shared bus. Therefore the shared memory is very frequently occupied. Thus, in such an environment, an increase in the number of processors can not improve the performance of the system beyond a certain limitation.

An approach has been proposed wherein each processor has a private cache in which it keeps a partial copy of data stored in the shared memory. Each processor performs read/write access to the data within its private cache, and thereby the shared bus and memory are not used very frequently. The above described approach is commonly referred to as a multi-cache system. That approach, however, causes a problems in that when each processor modifies shared data in its cache without relation to other sharing processors, the sharing processors may, at any instant in time, have different data at a given address. Means for maintaining consistency of data at a given address in different caches is accordingly needed. Hereinafter, "the consistency of data" means that every processor looks at the same data at a given address.

One method for ensuring the consistency of data is the snoopy cache technique. The snoopy cache technique maintains the consistency of data among caches by having each processor's cache controller monitor the shared bus. That is, when a processor modifies shared data in its cache (i.e. data that is shared by one or more other processors), it sends information about how it modified the data and what address the modified data is at, on the shared bus. The cache controllers of the other processors see that information and update or invalidate the data in their caches to maintain the consistency.

Conventional snoopy cache techniques will typically adopt one of two conventional protocols to handle modification of shared data. According to the first conventional protocol, upon modification to shared data at a cache, copies at the other caches are invalidated. According to the second conventional protocol, upon modification to shared data at a cache the copies at the other caches are modified. For example, Dragon of the Xerox Corporation (U.S.A.), and FireFly of Digital Equipment Corporation (U.S.A.), use the update type. On the other hand, SPUR of the University of California uses the invalidate type. In addition to the above, TOP-1 (prototype name) of Tokyo Research Laboratory, IBM Japan Ltd., is designed to selectively switch between the update and invalidate types with implementation in software.

The above two types can equally maintain the consistency of data among a plurality of caches. That is, the updating and invalidating of data have the same effect with respect to the consistency. However they both have merits and demerits in accordance with their approaches.

The update type is suitable for cases where manipulating such data tightly shared by processors (or where the processors almost equally access shared data). The invalidate type is not suitable for those cases, because each time a processor modifies a shared data area, the copies in the caches of the other sharing processors are invalidated. Thus, a read/write access to that area by the other sharing processors inevitably causes a cache miss and requires the access to the shared bus. In this regard, the update type cache is advantageous since the copies in the sharing caches are updated, thereby enabling the processors to read the data area without accessing to the shared bus. Generally speaking, the update type works well when used for buffers in a parallel program of the producer and consumer model, and semaphore or the like used to synchronize processors, etc.

The invalidate type, on the other hand, is preferably applied to shared data which is exclusively used by one processor or to shared data to which is not accessed frequently by the other processors. Paging of process migration may cause data exclusively held by one processor to be considered shared while it should be kept as exclusive. This situation places unnecessary shared data in the system and degrades the performance. The invalidate type is effective in that situation.

In light of the strengths and weaknesses of each, a preference between the above types of protocols can not be decided in a straightforward manner in that the performance of the system under a given protocol depends on the characteristics of a program to be executed and the operational status of individual processors. Thus far, the use of the above-described conventional protocols has not enabled efficient operations in every data access situation.

The above mentioned Dragon, FireFly and SPUR each provides only one type of protocol, and consequently achieve only degraded performance in some situations. TOP-1 can selectively switch between the above mentioned types of protocols by means of software. This, however, still does not resolve the problem of how to switch. The resolution of that problem is a key factor in whether or not the performance is fully enhanced.

SUMMARY OF THE INVENTION

An object of the invention is accordingly to provide a mechanism enabling efficient and dynamic switching between the protocols of the invalidate and update types. This mechanism can reduce traffic on the shared bus and improve the system performance.

Another object of the invention is to provide cache control wherein the above mechanism is utilized with introduction of a new cache protocol to reduce traffic in the shared bus.

Usually each processor repeatedly accesses a limited area of the memory within a short span of time. That area is referred to as a "working set" with respect to the processor. According to this invention, each time a write operation occurs to shared data, each of the sharing processors determines whether or not the data belongs to its working set. If a sharing processor determines that the data belongs to its working set, then the cache consistency is maintained by the update type of procedure. Otherwise cache consistency is maintained via the invalidate type of procedure.

Data within the working set is likely to be used by the processor. The processor can access the newest data without using the bus, by updating data within the working set. In contrast, data outside of the working set has a lower probability of access by the processor. Nevertheless, under the update type of protocol, this data is required to be updated each time another processor accesses the data (if the data still exists in the cache). This invention reduces bus traffic for unnecessary updating by invalidating data out of the working set.

In one embodiment this invention improves the system performance by utilizing the above mechanism for determining the working set in conjunction with a new cache protocol, ALL_READ. A plurality of processors in a multiprocessor system using snoopy caches frequently share data or instruction code at one address. In this case, conventional snoopy cache protocols require the processor individually to use the bus to load the data or code into their caches. It achieves much improved system performance if, when a processor causes a read miss for data or code at an address, other processors likely to use the data or code automatically read it into their caches. In conventional systems, however, the other one or more caches can not predict the use of the data or code in advance. Therefore, the conventional systems cannot perform the broadcasting of read data efficiently. According to this invention, by using the working set determination mechanism, only data in the working set is applied with ALL_READ. This invention thereby provides ALL_READ efficiently, reduces bus traffic and improves the system performance.

BRIEF DESCRIPTION OF THE DRAWINGS

The invention will be better understood by reference to the accompanying drawing in which:

FIGS. 5 through 7 are diagrams illustrating the applications of the embodiment of FIG. 1. Drawing Key: P.. processor, C.. private cache, 1.. shared bus, 2.. shared memory, 3.. cache basic controller, 4.. data memory, 5.. mode switching controller, WSM.. working set memory.

DETAILED DESCRIPTION OF THE PREFERRED EMBODIMENT

A. Configuration of the Embodiment

An embodiment of the invention is described in detail below.

Figure 1:
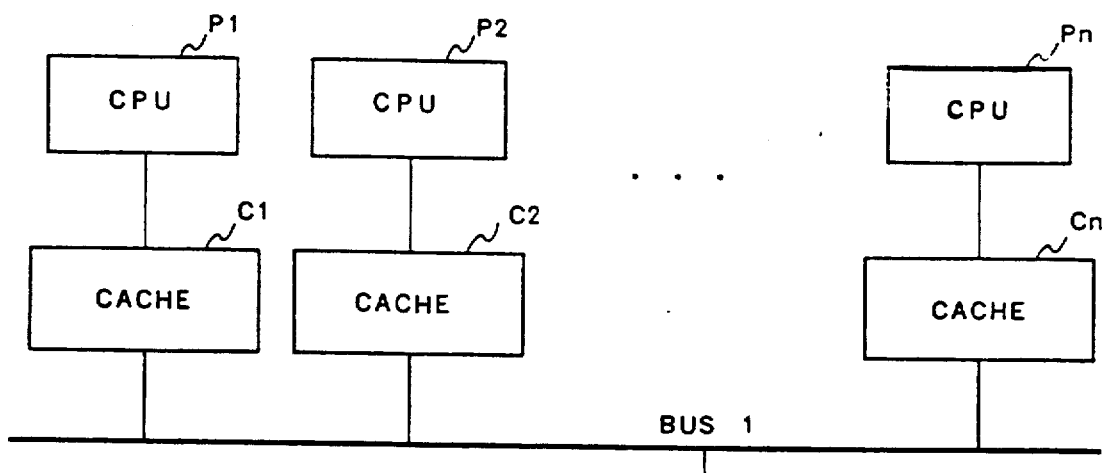
FIG. 1 is a block diagram illustrating the overall configuration of one embodiment of this invention.

FIG. 1 shows the overall configuration of the multiprocessor system of the embodiment, wherein a plurality of processors P1, P2, . . . Pn are connected to a shared bus 1 and shared memory 2 via respective caches C1, C2, . . . Cn. The caches C1, C2, . . . Cn enable the processors P1, P2, . . . Pn to perform memory access more rapidly on average, and have means for maintaining the consistency among the caches C1, C2, . . . Cn.

Figure 2:
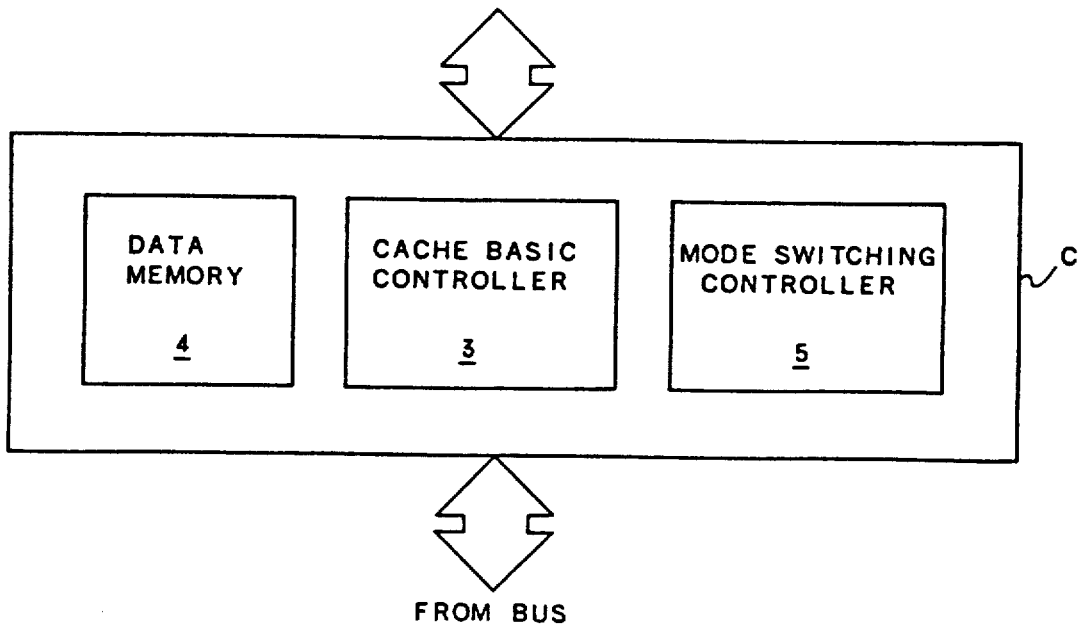
FIG. 2 is a block diagram illustrating the configuration of the private cache used in the embodiment of FIG. 1.

Each of the caches C is configured as shown in FIG. 2. A cache basic controller 3 performs the basic control of the the whole of the cache C, required when the cache C is accessed by the processor P, and when snooping the bus 1. A cache data memory 4 is a high speed memory for storing a partial copy of data stored at the main memory (the shared memory 2). The processor P can read/write required data via the data memory 4, most of the time without accessing the main memory (the data is accessed 4 bytes by 4 bytes). Therefore the processor P can perform more rapid memory access on average. According to the invention, there is also provided a mode switching controller 5, which switches the protocol mode of the cache C so as to have the cache basic controller 3 efficiently maintain the consistency among this cache and other caches, by monitoring the memory access by the processor and the memory access on the bus 1.

Figure 3:
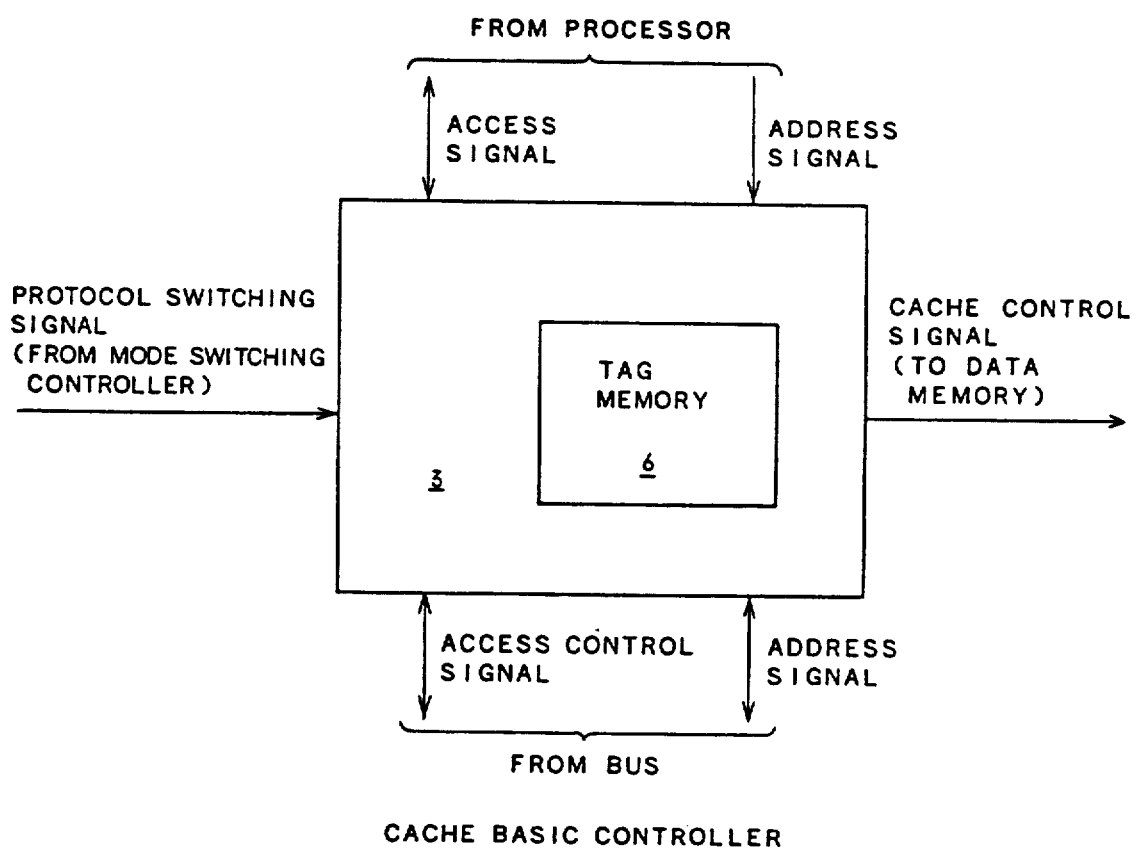
FIG. 3 is a diagram illustrating the configuration of the cache basic controller in FIG. 2.

FIG. 3 shows the cache basic controller 3. The controller 3 receives, as inputs, access control signals and address signals from both the processor P and bus 1. The cache basic controller 3 has a tag memory 6 for storing main memory addresses at which the cache C has copies of data. When the processor P accesses the cache or snooping operations are performed, the controller 3 checks whether or not addressed data is in the cache and performs required control for the cache.

Figure 4:
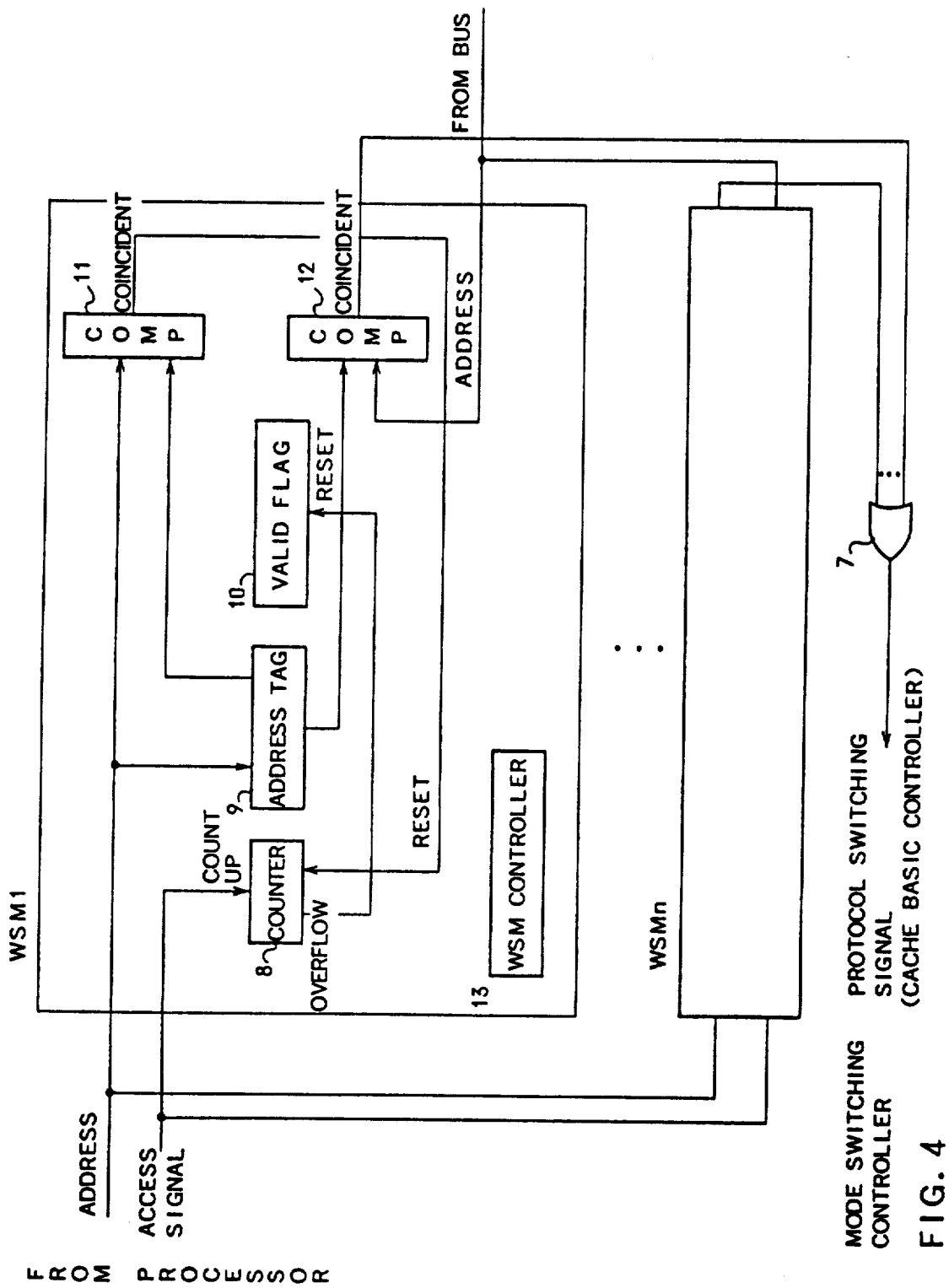
FIG. 4 is a block diagram illustrating the mode switching controller in FIG. 2.

FIG. 4 shows the mode switching controller 5, which consists of n working set memories (hereinafter denoted by WSM1, WSM2, . . . , WSMn, individually and WSM in general) and an n-input OR circuit 7. Each WSM consists of a counter 8, an address tag 9, a valid flag 10, two comparators 11, and 12, and a control circuit 13 which controls the WSM. In each WSM, one storage block (for example 4k byte size) included in the working set is registered. The mode switching controller 5 determines whether or not an access address by the processor P or on the bus 1 is included in the storage block within the working set. When the address is included in one of n storage blocks within the working set, the OR circuit 7 outputs "1", and the mode of the above cache basic controller becomes "update". Otherwise the OR circuit 7 outputs "0", and the mode of the cache basic controller 3 becomes "invalidate".

B. Operation of the Embodiment (1) Operation of the Mode Switching Controller When observed over a very short period time, a processor P frequently accesses a very limited memory space (a limited number of storage blocks). This memory space is referred to as a "working set". WSM's detect the working set and register storage blocks belonging to it. WSM's determine whether or not an address accessed by the processor P or on the bus 1 is within the working set. Over longer periods of time, the working set changes and unused storage blocks are deleted from WSM's.

The operations of the mode switching controller 5 are described in detail with reference to FIG. 4.

The address tag as shown in FIG. 4 keeps the address of a storage block within the working set. Assume here that the address space of the processor P is 2 to the M-th power bytes, the space of a storage block in the working set is 2 to the w-th bytes. The address tag accordingly stores the upper (M-w) bits of the address. The valid flag 10 indicates whether or not WSM stores the address of an effective storage block in the working set. Upon a memory access request by the processor or on the bus 1, each WSM uses the comparator 11 to compare between the upper (M-w) bits of the access address and the contents of the address tag 9. When the upper address bits are coincident to the contents, and the bit of the valid flag is "1", the access is determined as made within the working set, and the OR circuit 7 outputs "1".

The registration of a storage block belonging to the working set is performed as follows. When the processor P issues a memory access request for an address which does not come within any storage block of the working set, the address is registered as an address of a new storage block of the working set. For this registration one WSM with the valid flag of "0" is used, and the upper (M-w) bits of the address is written into the address tag 9, and the valid flag 10 is changed into "1". If the valid flags 10 of all the WSM's keep "1", then no new entry is registered in the working set.

Next the deletion of a storage block from the working set is described. When a storage block registered as included in the working set becomes unused, the block is deleted from WSM. For this purpose the counter 8 in WSM is used, which is incremented each time the processor P issues a memory access request and cleared when the memory access request comes within the corresponding storage block in the working set. In other words, the counter 8 indicates how many times, since the most recent access to the corresponding storage block in the working set, the processor P has accessed a storage area other than the corresponding storage block in the working set. When the counter 8 overflows, the storage block in the working set is determined as no longer used, the "1" in the valid flag is cleared and the storage block will be thereby deleted from the working set.

In this embodiment, the working set is registered in WSM's as described the above. The following describes the dynamic optimization of protocols based on the output of the mode switching controller 5 (the output of the OR circuit in FIG. 4), and the control for read broadcasting.

(2) Dynamic Optimization of Protocol Control

Each cache C of FIG. 1 snoops on (monitors) the bus 1. The cache basic controller 3 (FIG. 2) determines when a write operation is performed, via the bus, which effects data in its corresponding data memory 4. When the controller 3 determines that its data memory 4 has a copy of data which is effected (modified or overwritten) by the write operation, it maintains the consistency among caches by invalidating its copy or updating its copy. When a write operation is performed for data whose copy the cache has, in this embodiment, the mode switching controller 5 determines whether or not the data is included in the working set. If the data is included in the working set of the cache basic controller 3, then it operates in the update mode. Otherwise it operates in the invalidate mode. The update mode is more efficient for data in the working set which is likely to be frequently used. The invalidate mode is more efficient for data out of the working set which is not likely to be frequently accessed. The protocols are accordingly switched based on whether or not a write operation is performed to shared data in the working set, and thereby the consistency among the caches is efficiently maintained.

(3) Control for ALL READ

When a cache miss occurs in a bus connected multi-processor using conventional caches, individual processors use the bus 1 to read data into the caches from the memory 2. As each processor P sharing a large amount of data commences processing, it individually uses the bus 1 to read the shared data. In this case it could reduce the use ratio of the bus 1 and improve the system performance if, when a processor P reads data from the memory, the data could be transferred to the caches of other processors. This method is referred to as here "ALL_READ".

Since that method however purges out data stored in the caches of the other processors to store new data, the following points should be noted.

i) Selection of processors participating broadcasting operations: Since all the processors connected through the bus 1 do not necessarily process the shared data, a broadcasting operation should be performed only for processors which need transfer of the shared data.

ii) Synchronization among processors P: Even though processors process shared data, they are not necessarily synchronized with one another, and it is, therefore, not certain that when one processor P performs an ALL_READ operation another processor P needs that data. A broadcasting operation should be performed such that the data is transferred to processors which are dynamically selected as requiring the data.

Without taking the above into the account, ALL_READ can purge out required data from the cache and degrade the system performance.

This embodiment performs ALL_READ operations efficiently by using a detection mechanism for the working set. When a processor P performs an ALL_READ operation, an ALL_READ request is placed on the bus 1. At the same time the mode switching controllers 5 of the other processors P check whether or not the address of the request comes within the storage blocks in their respective working sets. When the address comes within the respective working sets, the cache basic controllers 3 cause the data to be written into their data memories 4. Otherwise they do not cause the data to be written into their data memories 4. Since processors P which do not use broadcasted shared data do not write in the data, the problem i) is resolved. With respect to problem ii), processors which do not use the data during broadcasting operation do not write in the data. In contrast, when a plurality of processors need the same large shared data block, an ALL_READ operation is performed as follows.

1) Each processor P uses the bus 1 to access the first part of shared data (by a usual access). The working block including that part of shared data is registered as a working set for each processor.

2) Next, one of the processors reads the next part of the shared data using an ALL_READ operation. Since this data part is within the working set registered in the step 1), the other processor P reads in the data part.

In that way, while usual accesses are performed for the first data part, ALL_READ operations are performed for the following data parts within the working block, and thereby the bus traffic is reduced and the system performance is improved.

C. Effectiveness of the Embodiment

In this embodiment, by using the dynamically optimized protocol control and ALL_READ control, bus traffic in a multiprocessor system is reduced and the system performance is improved. The effectiveness of the embodiment for some typical cases is described below.

1) Effectiveness with Dynamically Optimized Protocol Control a. Spin Lock: A spin lock technique is typical for exclusive control of a critical section in a multiprocessor. FIG. 5 conceptually shows spin lock, wherein a processor P sets a predetermined shared variable to 1 when entering the critical section, and resets it to 0 when exiting. A processor which is to enter the critical section checks the shared variable, and when it is 1, it waits for the variable to change to 0. The program shown in FIG. 5 is as follows.

(1) Read the shared variable x.
(2) Compare the read X to 1.
(3) When the comparison result indicates X equal to 1, then jump to the loop.
(4) When X is 0 in step (3), then check that X is 1, and set to 1. The instruction in step (4) performs the comparison and set operation in combination.
(5) When X is not 1 in the step (4), then jump to the loop.
(6) Perform the critical section.
(7) Reset X to 0 finally.

Assume here that one processor P1 is performing the critical section and the other processors P2 to P10 are waiting for X to change to 0 to enter the critical section in a multiprocessor system having 10 processors tightly coupled (n in FIG. 1 is 10). The caches operate as follows.

The processor P1 writes to X in step (7). Since the other caches have a copy of X at this time, the cache control circuits operate to maintain the consistency among the caches. If the consistency is maintained in the invalidate mode, copies of X of the processors P2 to P10 are invalidated. These processors are performing steps (1) to (3), and therefore they cause cache misses in step (1), and read copies of X by using the bus. In the above-described scenario, there are 10 operations that cause traffic on the bus, that is, bus traffic is caused once by step (7) by the processor P1, and 9 times by read misses in the step (1) by the processors P2 to P10. On the other hand, in the update mode, when the processor P1 performs a write operation in step (7) copies of X held by the processors P2 to P10 are updated, which does not cause read misses in the step (1). As a result, the frequency of bus traffic in total is one which occurs in step (7) by the processor P1.

According to the embodiment, while the processors P2 to P10 perform the loop of the steps (1) to (3), X is included in the working sets of the processors P2 to P10. Therefore when the processor P1 writes in X in step (7), the mode switching controllers 5 of the processors P2 to P10 instruct the cache basic controllers 3 to maintain the consistency among the caches in the update type. As aforementioned the bus traffic in the whole is reduced and the system performance is improved as a result.

b. Process Migration: While the above is a case where the update mode is superior to the invalidate mode, there are inverse cases.

In a multiprocessor system, a program is executed in a multiprocessing environment. Usually there are more processes than processors, and therefore processes are switched under predetermined conditions and allocated to the processors. Giving attention to one process, it is allocated to a processor P, and thereafter interrupted by the control program. At a later time, the process is again allocated to a processor P and it resumes operation. During the above operations, the processor to which the process is originally allocated is usually different from the processor to which the process is next allocated. The phenomenon that a process is moved around between different processors by process switching is referred to as "process migration".

In the update mode, a processor places write data (data to be written) on the bus 1 during its write operation, and copies in the caches of the other processors are updated with the data. When there is a large amount of shared data, the bus 1 is very frequently used. After process migration the involved process is executed on another processor (typically other than the processor which previously executed the process). The cache of the latter processor however still keeps a copy of the data which the process used. The data which the process is using is shared by the former and latter processors. Such shared data is here referred to as "false shared data". Process migration accordingly causes false shared data, and when the update mode is used, it increases the use ratio of the bus 1, and thereby affects the system performance.

In contrast, when using caches of the invalidate type, process migration does not affect the system performance. This is because when a process performs a write operation for false shared data, a copy of the false shared data in the cache of the processor on which the process was previously executed is invalidated, and it becomes non-shared data. For false shared data, write data is placed on the bus 1 once at the first time, but the bus 1 is not used later.

In this embodiment, the consistency among the caches is maintained in the update mode for data within the working set, and in the invalidate mode for data out of the working set. Further even when process migration occurs, the working set of the involved process is excluded from the working set memories of the cache C of the processor which previously executed the process, and thereby false shared data is manipulated in the invalidate mode.

In summary, some times the invalidate mode works better to maintain cache consistency, and other times the update mode does. In this embodiment, the protocols are such switched to achieve better performance, and thereby the system performance is improved.

2) Effectiveness of ALL_READ

Figures 6, 7:
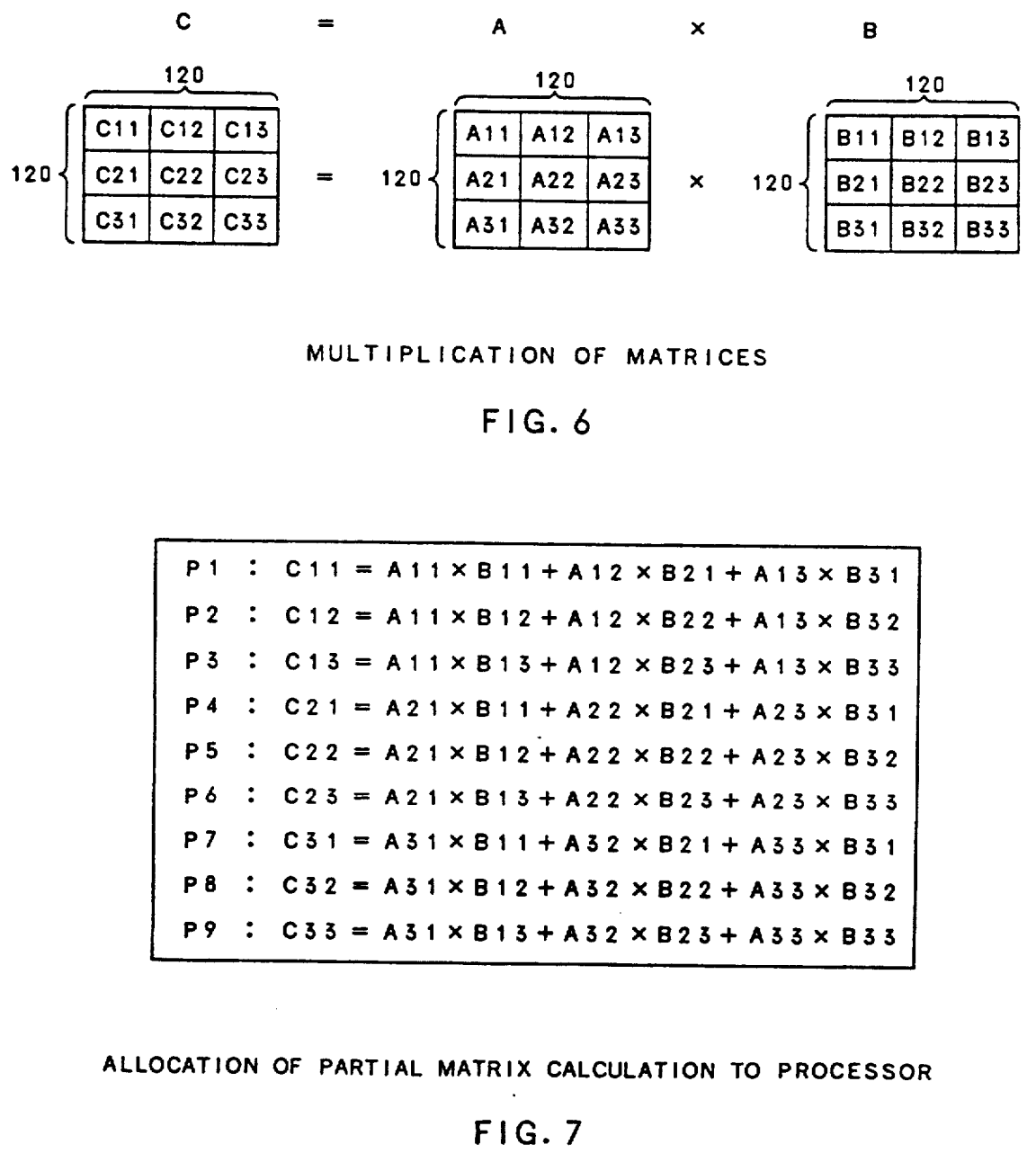

The efficiency of the ALL_READ operation is illustrated with the multiplication of two dimensional matrices. As shown in FIG. 6, the multiplication of two matrices each of 120×120 is performed by dividing each matrix into 9 partial matrices. As shown in FIG. 7, each processor P1 to P9 performs each multiplication of partial matrices. Assume an element of each matrix has 32 bits (4 bytes) and 32 bits of data is transferred on the bus each transfer cycle (of some fixed duration).

i. Using Usual Protocol: Since each processor P performs multiplication of partial matrices three times as shown in FIG. 7, it reads 6 partial matrices. Each partial matrix has 1,600 elements and one element is transferred with each bus transfer cycle. Each processor P accordingly requests 9,600 (=1,600×6) bus transfers. Further each of the 9 processors independently perform bus transfers. Thus, for the whole system 86,400 (=96,00×9) bus transfers are needed.

ii. Using ALL_READ: As will be best understood by reference to FIG. 7, each partial matrix is accessed by 3 processors. By using ALL_READ, data pieces within the working sets can be transferred to a plurality of caches with one transfer cycle. Assume here that elements of a partial matrix are placed in a congruent memory area. When looking at A11 for example, it is referenced by 3 processors, P1, P2, and P3. These processors read the first element of A11 by independently using the bus. At this time the memory area where A11 is placed is registered as the working set of the processors. Therefore when one of the processors reads the second and the following elements of A11 by using the bus 1, it is read into the caches of the other two processors. In order for the three processors to read A11, 1,602 (=3×159) bus transfers are required. The other 8 partial matrices are likewise transferred. Thus, in the whole, there are 14,418 bus transfers.

As described in the above, ALL_READ can reduces bus transfer frequency from 86,400 transfers, which is conventionally required, to 14,418 transfers.

E4. Modifications of the Embodiment

Although the invention has been described with respect to the preferred embodiment, it will be readily understood that this invention should not be limited to the preferred embodiment and various modifications can be made. For example, The determination of whether or not accessed data comes within the working set can be alternatively performed using a LRU method. The point is that the update mode is used for data having locality and the invalidate mode is used for data not having locality.

F. Effects of the Invention

As described the above, this invention can provide a mechanism enabling dynamically switching between the protocols of the invalidate and update types in such a manner that each protocol is used under circumstances where it would perform most efficiently.

This mechanism can reduce traffic on the shared bus and improve the system performance. This invention can further provide cache control wherein the above mechanism is utilized with introduction of a new cache protocol to reduce traffics in the shared bus.

Having thus described our invention, what we claim as new and desire to secure by Letters Patent is:

1. In a multiprocessor system having a plurality of processors, each processor connected to a shared memory and a shared bus through a corresponding private cache, each private cache having a corresponding controller, comprising:

coherency means, coupled to the shared bus, for determining whether a cache data coherence procedure needs to be performed on a copy of shared data held by the private cache;

determination means for determining whether a piece of data on the shared bus is included in a storage block belonging to a working set of the private cache; and, consistency maintenance means, coupled to said coherency means and said determination means, for dynamically selecting one of a plurality of data constancy maintenance procedures responsive to said determination means, and for performing a data consistency maintenance procedure so selected, responsive to a determination by said coherency means that said cache data coherence procedure needs to be performed by appropriate selection of updating or invalidation of the contents of the private cache in accordance with the determination as to whether or not the piece of date on the shared bus is part of the working set.

2. The multiprocessor system of claim 1, wherein said determination means comprises:

a mode switching controller including storing means for storing identifiers indicative of a plurality of storage blocks belonging to said working set; and, comparison means for determining whether an identifier indicative of a storage block accessed by one of the plurality of processors is among the identifiers stored in the storing means.

3. The multiprocessor system of claim 2 wherein said determination means further comprises:

access means for determining when the processor accesses data in a first storage block not belonging to said working set of the private cache and for causing said first storage block to be included in said working set of data stored in a limited area of the memory repeatedly accessed within a short span of time, said access means further comprising means for causing the first storage block to be excluded from said working set when the processor accesses data in one or more other storage blocks a predetermined number of times subsequent to the processor's most recent access to the first storage block.

4. The multiprocessor system of claim 1 wherein the plurality of data consistency maintenance procedures comprise an invalidate type procedure and an update type procedure for invalidating or updating data in cache.

5. The multiprocessor system of claim 4 wherein when said determination means determines that said piece of data is in a storage block belonging to said working set, said update type procedure is selected by said consistency maintenance means, and when said determination means determines that said piece of data is in a storage block not belonging to said working set, said invalidate type procedure is selected by said consistency maintenance means by appropriate selection of updating or invalidation of the contents of the private cache in accordance with the determination as to whether or not the piece of date on the shared bus is part of the working set.

6. In a multiprocessor system having a plurality of processors, each processor connected to a shared memory and a shared bus through a corresponding private cache, a method for controlling the private cache comprising:

a snoop step of monitoring the shared bus;

after said monitoring has commenced,
- a first determining step of determining whether a cache data coherence procedure needs to be performed on a copy of shared data held by the private cache; and
- a second determining step of, responsive to said monitoring, determining whether a piece of data on the shared bus is included in a storage block belonging to a working set of the private cache;
- a selection step of selecting one of a plurality of data constancy maintenance procedures responsive to said second determining step; and,
- a data consistency step of performing a data consistency maintenance procedure selected by said selection step, when it is determined by said first determining step that said cache data coherence procedure needs to be performed.

7. The method of claim 6, wherein said second determining step further comprises:
- a storage step of storing identifiers indicative of a plurality of storage blocks belonging to said working set; and,
- a third determining step of determining whether an identifier indicative of a storage block accessed by one of the plurality of processors is among the identifiers stored by said storage step.

8. The method of claim 7 wherein said second determination step further comprises:
- a fourth determining step of determining when the processor accesses data in a first storage block not belonging to said working set of the private cache and causing said first storage block to be included in said working set, and
- an exclusion step of causing the first storage block to be excluded from said working set when the processor accesses data in one or more other storage blocks a predetermined number of times subsequent to the processor's most recent access to the first storage block.

9. The method claim 6 wherein said data consistency maintenance procedure selected by said selection step is selected from a group comprising an invalidate type procedure and an update type procedure.

10. The multiprocessor system of claim 9 wherein said when said second determining step determines that said piece of data is in a storage block belonging to said working set, said update type procedure is selected by said selection step, and when said second determining step determines that said piece of data is in a storage block not belonging to said working set, said invalidate type procedure is selected.

* * * * *